United States Patent
Yajima et al.

(10) Patent No.: US 6,856,375 B2
(45) Date of Patent: Feb. 15, 2005

(54) LIQUID CRYSTAL LIGHT VALVE AND PROJECTION DISPLAY DEVICE INCLUDING THE SAME

(75) Inventors: Akitaka Yajima, Tatsuno-machi (JP); Mutsuya Furuhata, Hata-machi (JP); Hisashi Iechika, Shiojiri (JP); Toshio Matsumiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 09/925,315

(22) Filed: Aug. 10, 2001

(65) Prior Publication Data

US 2002/0126228 A1 Sep. 12, 2002

(30) Foreign Application Priority Data

Sep. 1, 2000 (JP) ........................................ 2000-264839

(51) Int. Cl.⁷ .............................................. G03B 19/18
(52) U.S. Cl. .......................................... 352/52; 352/20
(58) Field of Search .......................... 353/52, 20; 349/8

(56) References Cited

U.S. PATENT DOCUMENTS 6,481,854 B1 * 11/2002 Sugawara et al. ............ 353/52
6,592,224 B2 * 7/2003 Ito et al. ....................... 353/20

* cited by examiner

*Primary Examiner*—John F. Niebling
*Assistant Examiner*—Andre' C. Stevenson
(74) *Attorney, Agent, or Firm*—Oliff & Berridge, PLC

(57) ABSTRACT

The invention provides a liquid crystal light valve that makes it possible to increase the life of a polarizer at a light-exiting-surface side of the liquid crystal light valve by reducing the burden thereon, and a projection display device that incorporates the liquid crystal light valve. In liquid crystal light valves that modulate incident light in accordance with image information, at least two corresponding polarizers are provided respectively at the light-exiting-surface sides of liquid crystal panels.

5 Claims, 7 Drawing Sheets

[FIG. 1]
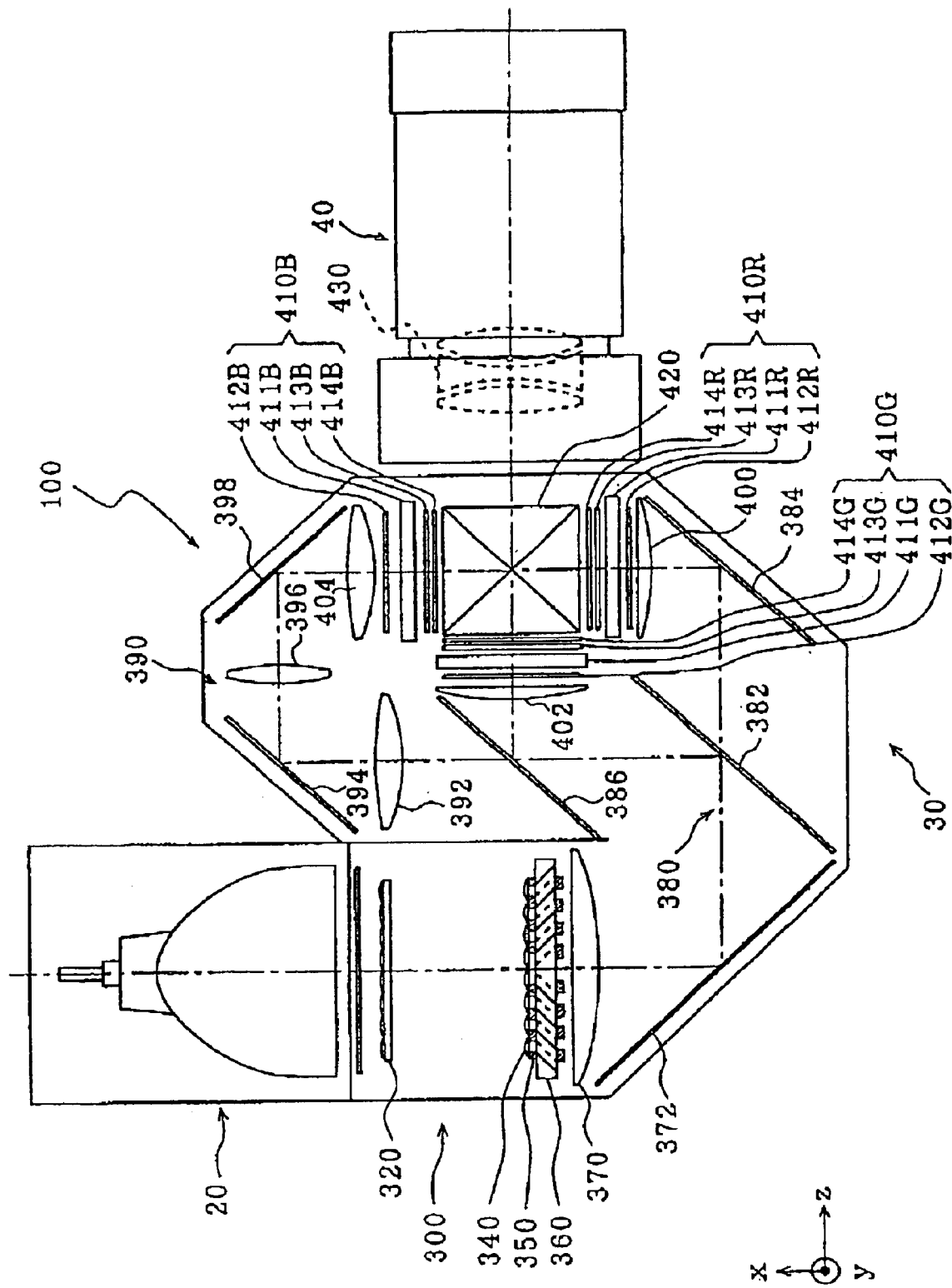

[FIG. 2]
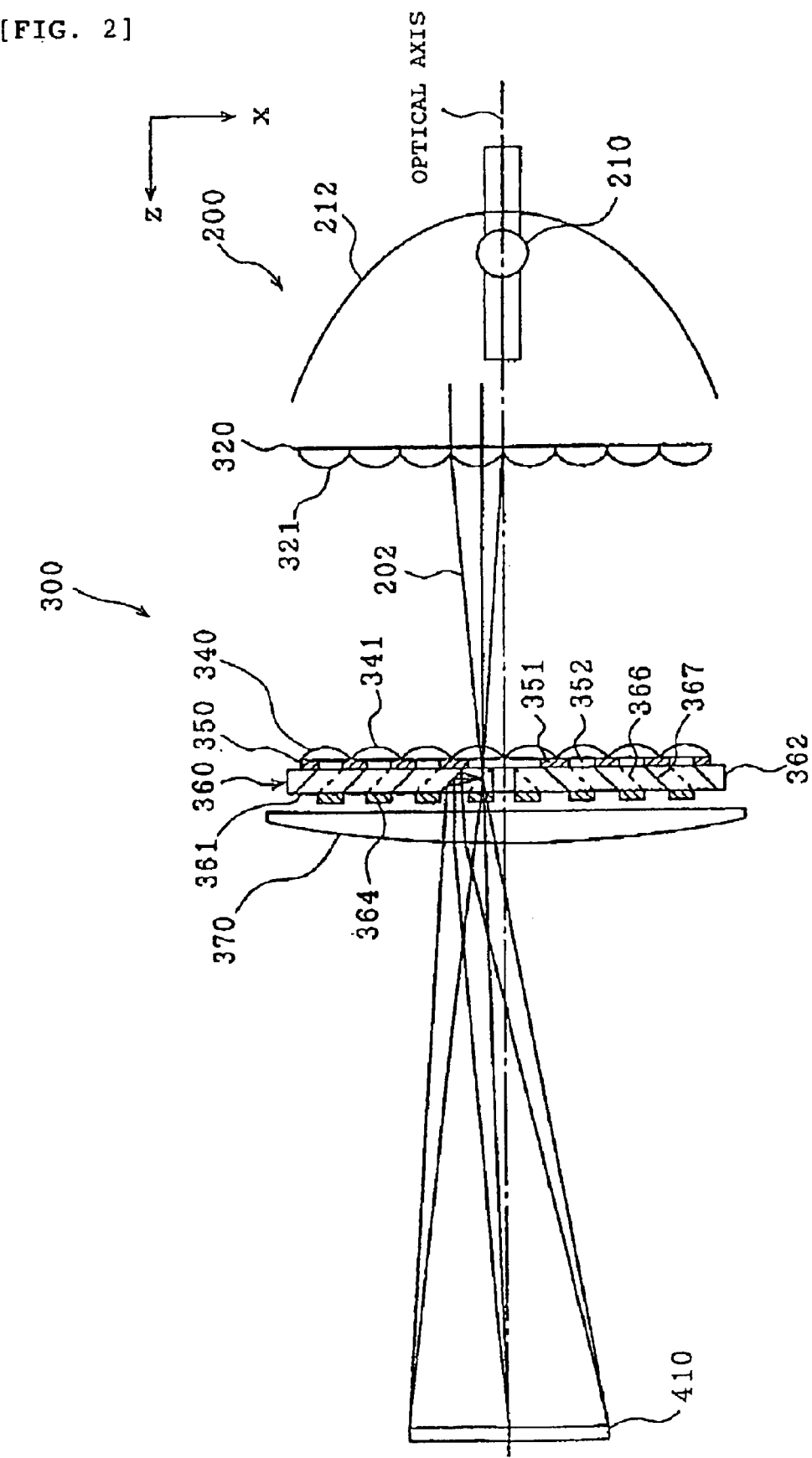

[FIG. 3]
(A) 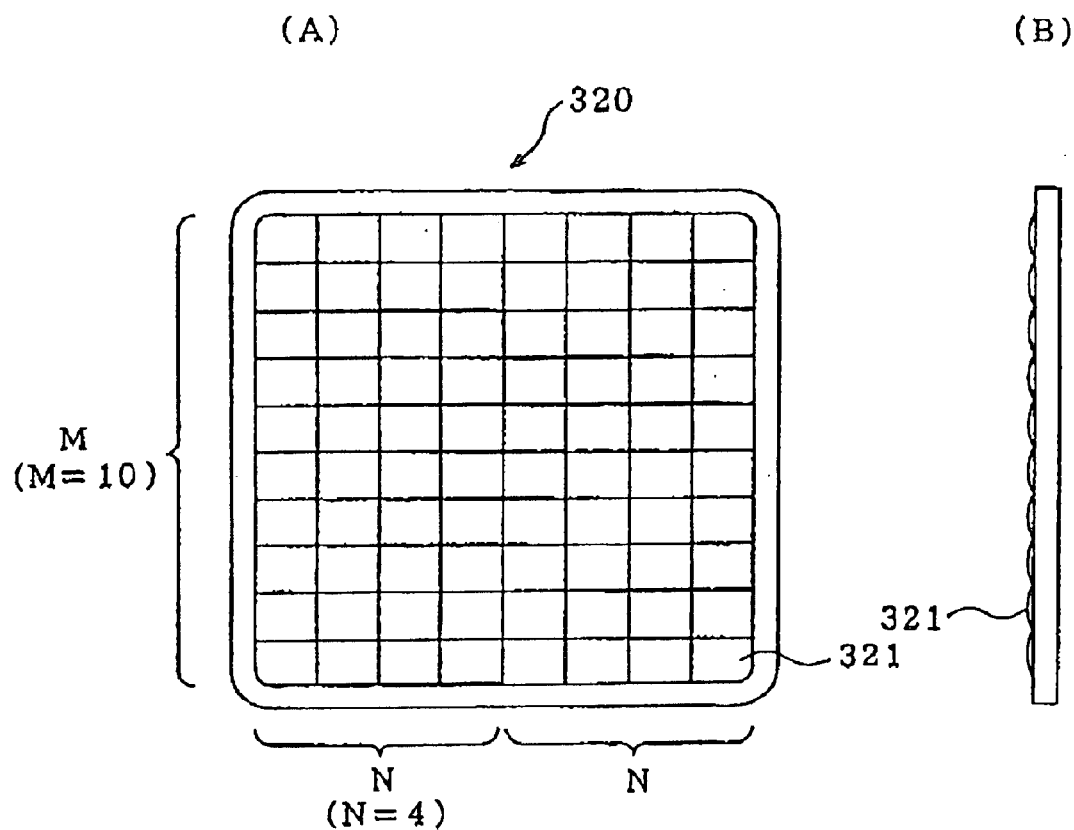 (B)
[FIG. 4]
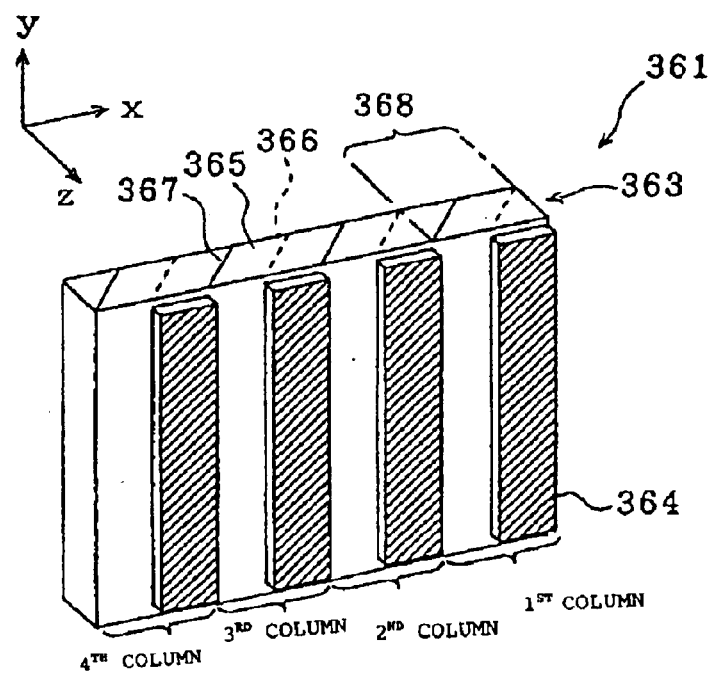

[FIG. 5]
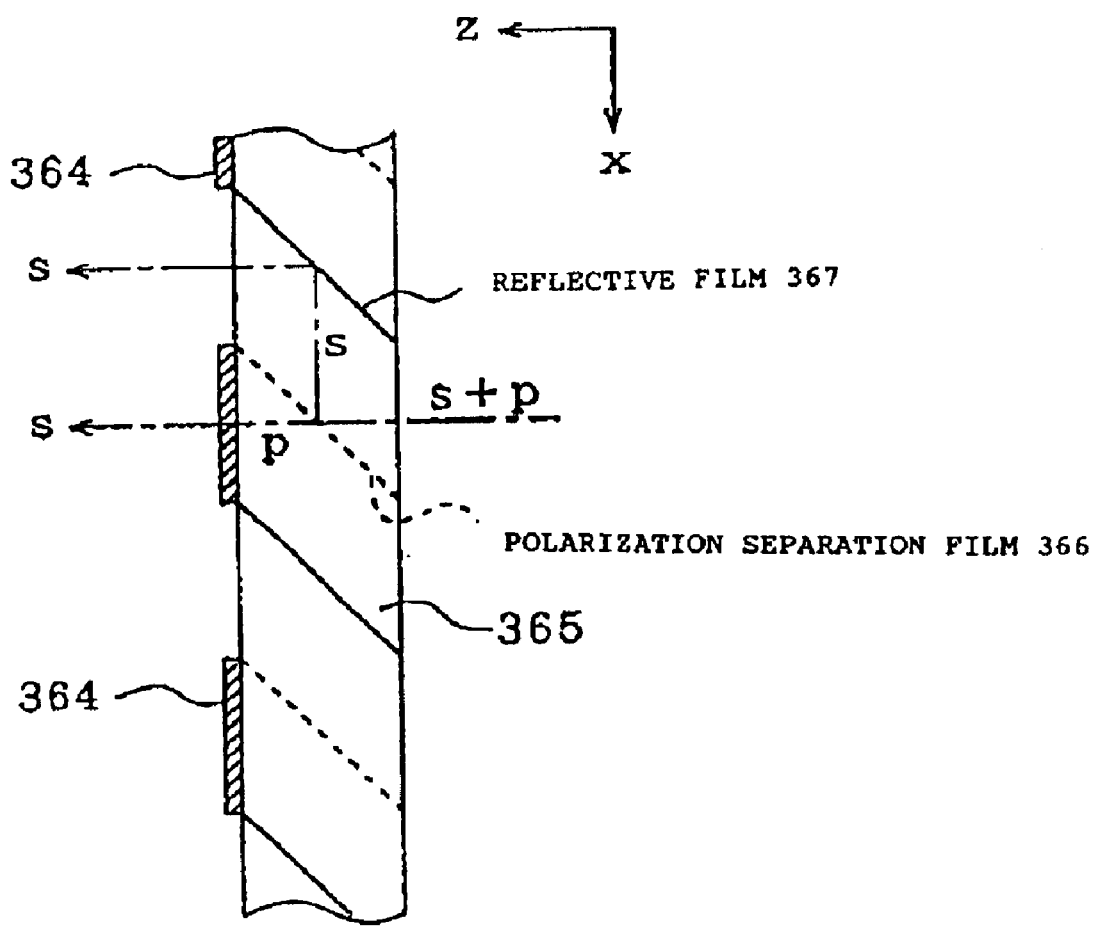

[FIG. 6]
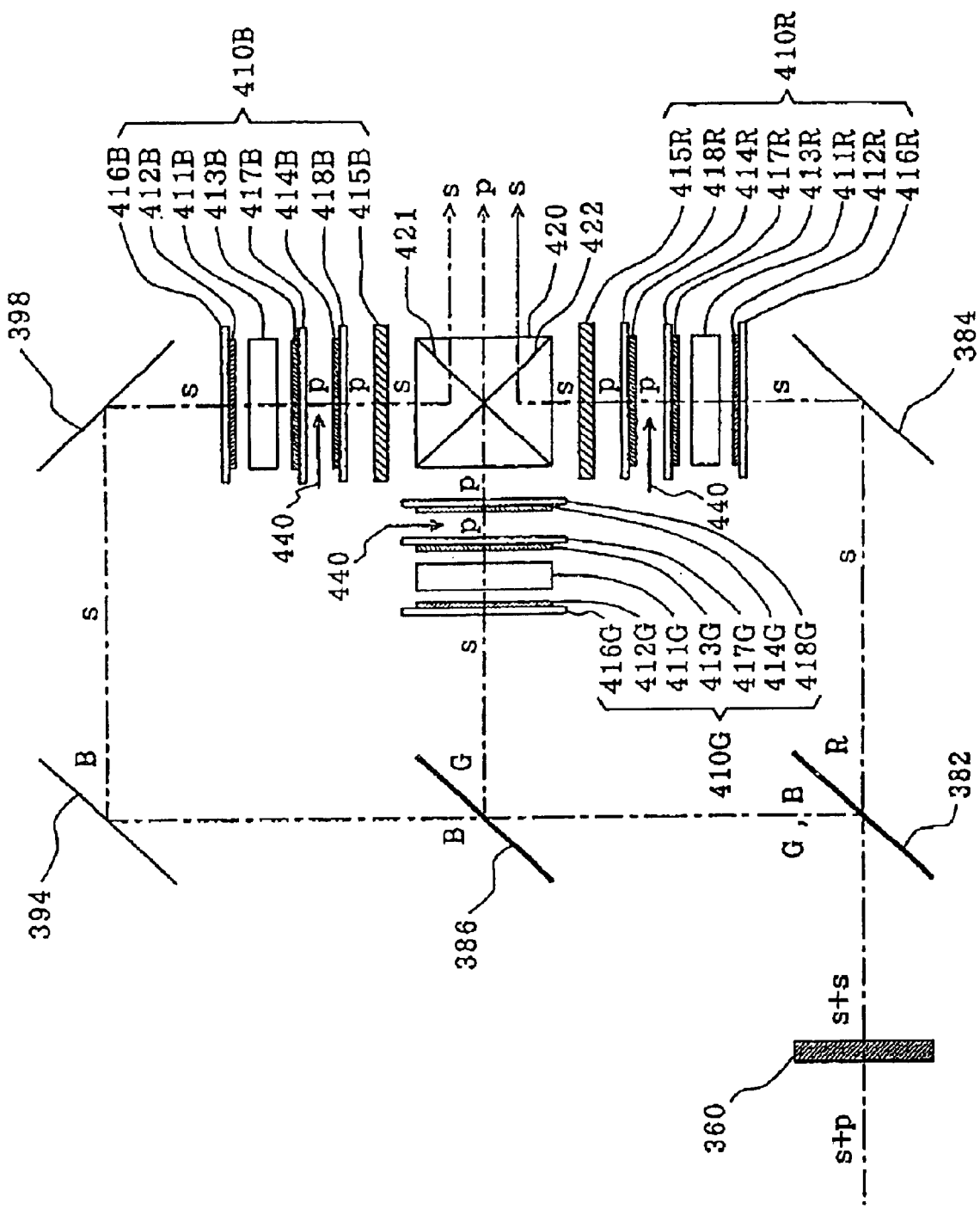

[FIG. 7]
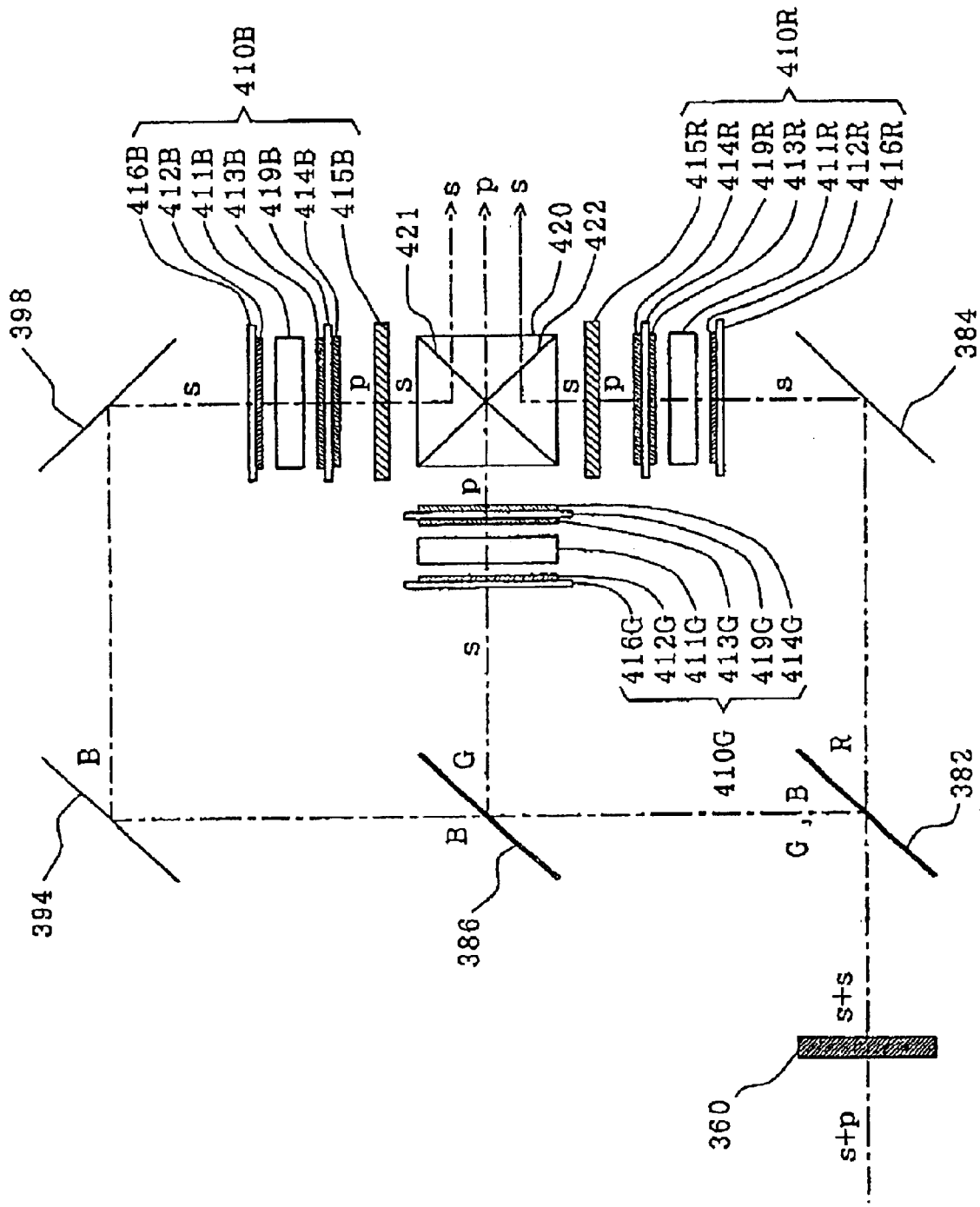

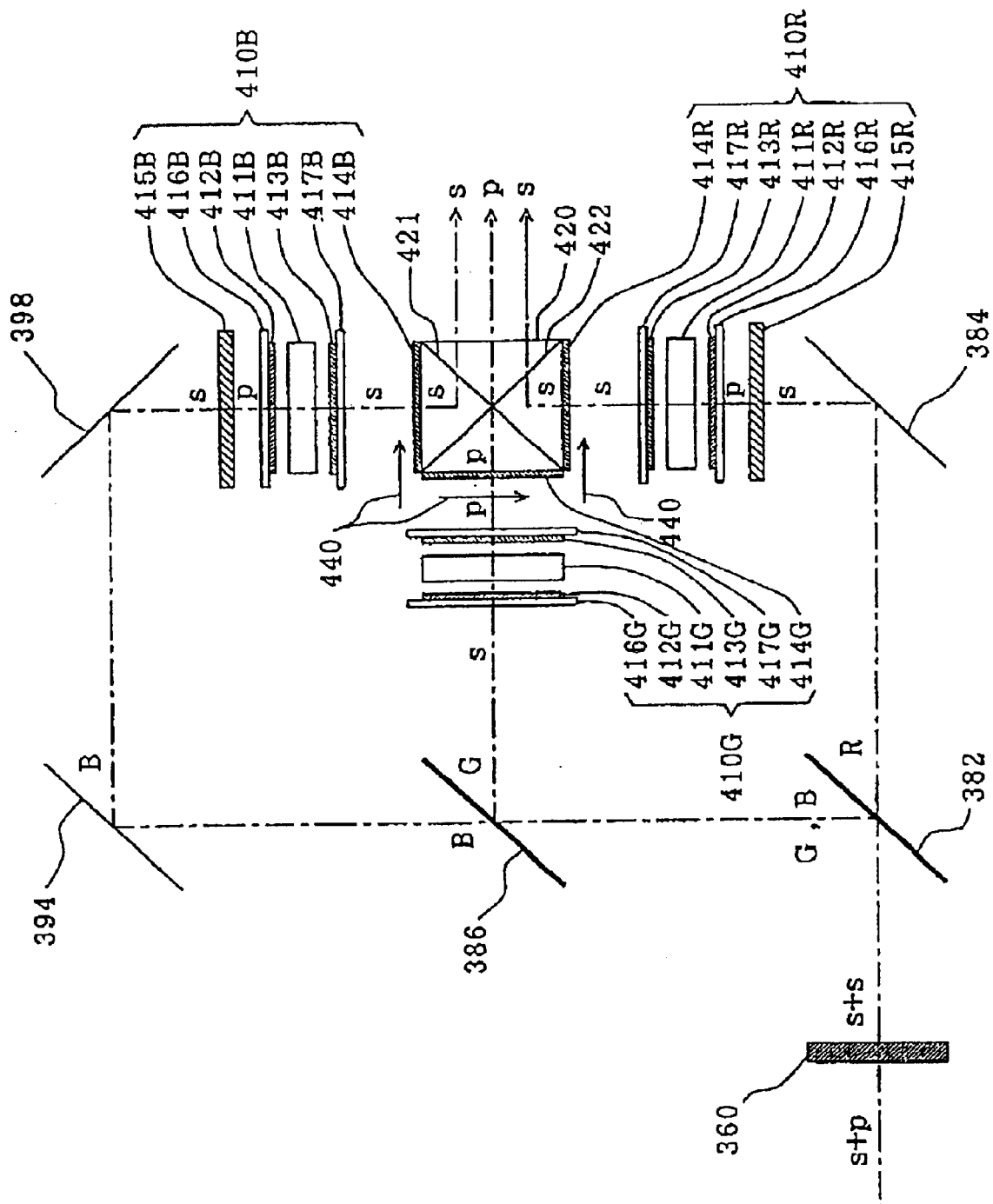
[FIG. 8]

LIQUID CRYSTAL LIGHT VALVE AND PROJECTION DISPLAY DEVICE INCLUDING THE SAME

BACKGROUND OF THE INVENTION

1. Field of Invention

The present invention relates to a liquid crystal light valve and to a device, such as a projection display device, that incorporates the liquid crystal light valve.

2. Description of Related Art

A typical projection display device (hereinafter referred to as "projector") includes an illumination optical system that includes a polarization generation optical system that converts unpolarized light that has exited from a light source into a predetermined linearly polarized light beam and causes the converted light beam to exit therefrom; a color light separation optical system that separates the linearly polarized light beam that has exited from the illumination optical system into light beams of three colors, i.e., a red light beam, a green light beam, and a blue light beam; three light valves that modulate the corresponding color light beams in accordance with image information (hereinafter referred to as "image signals"); a color light synthesizing optical system that includes a cross dichroic prism that synthesizes each of the modulated color light beams; and a projection optical system that projects the synthesized light onto a screen.

In this device, the projection display device realizes increased numerical apertures of the liquid crystal light valves, and uses an integrator lens, having small lenses disposed in a matrix arrangement, in the polarization generation optical system of the illumination optical system in order to display a high-brightness, high-quality and high-contrast image.

SUMMARY OF THE INVENTION

However, in a conventional liquid crystal light valve, a light-incident surface side and a light-exiting-surface side of the liquid crystal light valve are each provided with one polarizer. On the other hand, projection display devices are currently being developed to achieve higher brightness as mentioned above, so that the burden on the polarizer at the light-exiting-surface side is increasing more and more as a result of achieving higher brightness. In other words, even beyond usual image display, such as when a dark display is to be realized, most of the light is absorbed by the polarizer that is provided at the light-exiting surface side, so that this polarizer generates heat. Therefore, a problem arises in that the life of the polarizer becomes short.

The present invention addresses such a problem. It is an object of the invention to provide a liquid crystal light valve that makes it possible to increase the life of a polarizer that is disposed at a light-exiting-surface side of the liquid crystal light valve by decreasing the burden on this polarizer, and to provide a device, such as a projection display device, that incorporates the liquid crystal light valve.

A liquid crystal light valve of the present invention is provided such that, in a liquid crystal panel that modulates incident light in accordance with image information, at least two polarizers are provided at a light-exiting-surface side of the liquid crystal panel.

In the present invention, since at least two polarizers (that is, light-exiting-side polarizers) are provided at the light-exiting-surface side of the liquid crystal panel, the task of absorbing light can be divided among each of the light-exiting-side polarizers, thereby making it possible to divide the task of heat generation among the light-exiting-side polarizers. Therefore, even for a dark display, the burden on the light-exiting-side polarizers can be reduced which enhances the life of the exiting-side polarizers.

It is preferable that the polarization degree of a first polarizer that is closer to the light-exiting-surface side of the liquid crystal panel be lower than the polarization degree of a second polarizer.

By virtue of this structure, the ratio of division of the task of absorbing light by the first and second polarizers can be adjusted.

It is preferable that at least the first and second polarizers include glass members.

This structure is preferable because, by using glass members, temperature rises of the first polarizer and the second polarizer can be restricted by prompting diffusion of heat by the absorption of light by the first polarizer or second polarizer.

In this case, the glass members may be substrates or prisms, and preferably have physical properties of high thermal conductivities. The glass members having physical properties of high thermal conductivities can be formed of either sapphire or crystal.

It is preferable to use a polarizer having high weather resistance for the first polarizer, and a polarizer having a high polarization degree for the second polarizer. For example, a dye polarizer that is highly resistant to light and heat is used for the first polarizer, while an iodine polarizer that has a high contrast ratio is used for the second polarizer.

The first polarizer is bonded to a substrate formed of glass, sapphire, or crystal. The second polarizer is bonded to a substrate formed of glass, sapphire, or crystal.

By using glass, sapphire, or crystal to form a substrate to support the first polarizer and a substrate to support the second polarizer, it is possible to restrict temperature rises of the first and second polarizers.

The first and second polarizers may be bonded to the front and back sides of a same substrate. This substrate performs more effectively when it is formed of a material having high thermal conductivity.

Since the number of supporting substrates of these polarizers can be reduced, it is possible to construct the liquid crystal light valve with a small/compact size. Therefore, the projector using this liquid crystal light valve can be made to be small/compact in size.

It is preferable that the first and second polarizers be spatially separated by a gap, with either a cooling gas or a cooling liquid being made to pass in the gap.

In general, air can be used as the cooling gas. By causing either a cooling gas or liquid to flow in the gap between the first and second polarizers, temperature rises of these polarizers can be restricted.

A projection display device of the present invention includes any one of the liquid crystal light valves discussed above in accordance with corresponding color light beams of three colors that have been separated by a color light separation optical system.

When the liquid crystal light valve of the present invention is used, the task of absorbing light is divided among the plurality of light-exiting-side polarizers as described above, so that the projection display device can provide sufficiently high brightness. In addition, the life of the projection display device itself can be increased.

At least a red-light liquid crystal light valve and a blue-light liquid crystal light valve include λ/2 retardation films.

After passage of the color light beams of three colors that have been separated by the color light separation optical system through the corresponding color-light liquid crystal light valves having the above-described structures, each of the color light beams is synthesized by a cross dichroic prism. At this time, it is preferable that the red light beam and the blue light beam that are incident upon the cross dichroic prism be s-polarized light beams, and the green light beam to be a p-polarized light beam. Therefore, the red-light and the blue-light liquid crystal light valves utilize λ/2 retardation films to convert the p-polarized light beams that exit from their corresponding first polarizers into s-polarized light beams.

This structure is utilized because, when this structure is used, the efficiency with which light is used at the cross dichroic prism can be increased.

BRIEF DESCRIPTION OF THE DRAWINGS

FIG. 1 is a plan view of optical systems of a projection display device in accordance with the present invention;

FIG. 2 illustrates an illumination optical system of the optical systems shown in FIG. 1;

FIGS. 3(A) and 3(B) are a front view and a side view of a first lens array of the illumination optical system, respectively;

FIG. 4 is a perspective view of the exterior of a polarization conversion element array;

FIG. 5 is a schematic view of the operation of the polarization conversion element array;

FIG. 6 is a schematic that shows the structures of the liquid crystal light valves shown in FIG. 1 in relation with polarization directions of light;

FIG. 7 is a schematic that shows the structures of liquid crystal light valves of another embodiment of the present invention in relation with polarization directions of light; and FIG. 8 is a schematic that shows the structures of liquid crystal light valves of still another embodiment of the present invention in relation with polarization directions of light.

DETAILED DESCRIPTION OF PREFERRED EMBODIMENTS

Hereunder, a description of embodiments of the present invention will be provided with reference to the drawings. In the following description, unless otherwise specified, the direction of propagation of light is defined as the z direction, and, as viewed from the z-direction, the 12 o'clock direction is defined as the y direction and the 3 o'clock direction is defined as the x direction. In other words, the direction of propagation of light in the planes of the drawings is defined as the z direction, the direction perpendicular to the planes of the drawings (sheets) is defined as the y direction, and the direction parallel to the planes of the drawings (sheets) is defined as the x direction. The x, y, and z directions are perpendicular to each other. An s-polarized light beam is a polarized light beam that possesses a polarization axis that is perpendicular to the y axis or the planes of the drawings, whereas a p-polarized light beam is a polarized light beam that possesses a polarization axis that is horizontal to the x axis or the planes of the drawings.

FIG. 1 is a schematic plan view of optical systems of a projection display device that incorporates liquid crystal light valves according to the present invention. The three main optical systems of a projection display device 100 are a light source unit 20, an optical unit 30, and a projection lens unit 40.

The optical unit 30 includes an integrator optical system 300, a color light separation optical system 380 that includes dichroic mirrors 382 and 386 and a reflective mirror 384, and a relay optical system 390 that includes a light-incident-side lens 392, a relay lens 396, and reflective mirrors 394 and 398, all of such optical systems being described below. Further, the optical unit 30 includes three field lenses 400, 402, and 404; three liquid crystal light valves 410R, 410G, and 410B; and a cross dichroic prism 420 which is a color light synthesizing optical system.

The light source unit 20 is disposed at a light-incident-surface side of a first lens array 320 of the optical unit 30. The projection lens unit 40 includes a projection lens 430 in its interior as well as a zoom mechanism. The light source unit 20 is disposed at a light-exiting-surface side of the cross dichroic prism 420 of the optical unit 30.

FIG. 2 illustrates an illumination optical system that illuminates three liquid crystal panels which are illumination areas of the projection display device shown in FIG. 1. The illumination optical system includes a light source 200, which is provided in the light source unit 20, and the integrator optical system 300, which is provided in the optical unit 30. The integrator optical system 300 includes the first lens array 320, a second lens array 340, a light-shielding plate 350, a polarization conversion element array 360, and a superimposing lens 370.

For simplifying the description, in FIG. 2, only the main structural elements for illustrating the functions of the illumination optical system are shown.

The light source 200 includes a light source lamp 210 and a concave mirror 212. Radiant light that has exited from the light source lamp 210 is reflected by the concave mirror 212, and the reflected light exits in the direction of the first lens array 320 as light beams that are substantially parallel to the optical axis of the light source.

Here, a halogen lamp, a metal halide lamp, or a high pressure mercury lamp may be used as the light source lamp 210, and it is preferable to use a parabolic mirror as the concave mirror 212.

FIGS. 3(A) and 3(B) are a front view and a side view of the exterior of the first lens array 320. In the first lens array 320, small lenses 321 having rectangular contours are disposed in a matrix arrangement having N×2 columns (here, N=4) in the vertical direction and M rows (here, M=10) in the horizontal direction. The external shape of each small lens 321 when viewed from the z direction is set so that each shape is substantially the same as the shape of each of the liquid crystal panels 411R, 411G, and 411B. For example, when the aspect ratio of an image formation area of each liquid crystal panel (that is, the ratio between the horizontal and vertical dimensions) is 4:3, the aspect ratio of each small lens 321 is set to 4:3. In this manner, the first lens array 320 functions to divide the substantially parallel light beams that have exited from the light source lamp 210 into a plurality of sub light beams and to cause the plurality of sub light beams to exit therefrom.

The second lens array 340 functions to guide the plurality of sub light beams that have exited from the first lens array 320 so that they converge on polarization separation films 366 of two polarization conversion element arrays 361 and 362. The second lens array 340 includes small lenses 341, with the number of small lenses 341 being the same as the number of lenses of the first lens array 320. The lenses of the first lens array 320 and the lenses of the second lens array 340 may face either the +z direction or the −z direction, or, as shown in FIG. 2, in different directions.

The polarization conversion element array 360 forms a polarization generation optical system that generates linearly polarized light beams in order to efficiently use unpolarized illumination light. Here, as shown in FIG. 2, the two polarization conversion element arrays 361 and 362 are disposed so as to have symmetric orientations, with the optical axis being disposed therebetween. However, one polarization conversion element array that is disposed so as to have the same orientation may be used. FIG. 4 is a perspective view of the exterior of one of the polarization conversion element arrays, i.e., the polarization conversion element array 361. The polarization conversion element array 361 includes a polarization beam splitter array 363 that includes a plurality of polarization beam splitters and λ/2 retardation films 364 (λ represents the wavelength of light) that are selectively disposed on portions of a light-exiting surface of the polarization beam splitter array 363. The polarization beam splitter array 363 has a shape formed by successively bonding a plurality of columnar light-transmissive members 365 that are parallelogrammic in cross section. The polarization separation films 366 and reflective films 367 are alternately formed on interfaces between the light-transmissive members 365. The λ/2 retardation films 364 are selectively bonded to image portions in the x direction of the light-exiting surfaces of the polarization separation films 366 or the reflective films 367. In this example, the λ/2 retardation films 364 are bonded to the image portions in the x direction of the light-exiting surfaces of the polarization separation films 366. Dielectric multilayer films are used for the polarization separation films 366, and dielectric multilayer films or metallic films are used for the reflective films 367.

The polarization conversion element array 361 functions to convert light beams that are incident thereupon into one type of linearly polarized light beams (for example, s-polarized light beams or p-polarized light beams) and to cause the linearly polarized light beams to exit therefrom. FIG. 5 is a schematic view illustrating the operation of the polarization conversion element array 361. When unpolarized light, including an s-polarized component and a p-polarized component, is incident upon a light-incident surface of the polarization conversion element array 361, the incident light is first separated into an s-polarized light beam and a p-polarized light beam by its corresponding polarization separation film 366. The s-polarized light beam is reflected substantially vertically by each polarization separation film 366, and is further reflected by its corresponding reflective film 367. On the other hand, the p-polarized light beam passes substantially without change through its corresponding polarization separation film 366. The λ/2 retardation films 364 are disposed on surfaces from which the p-polarized light beams that have passed through the corresponding polarization separation films 366 exit, so that the p-polarized light beams are converted into s-polarized light beams, which then exit from the corresponding λ/2 retardation films 364. Therefore, the light that has passed through the polarization conversion element array 361 mostly becomes s-polarized light beams, which exit therefrom. In order to convert light that exits from the polarization conversion element array 361 into p-polarized light beams, the λ/2 retardation films 364 are disposed on portions of the surface from which s-polarized light beams that have been reflected by the corresponding reflective films 367 exit. As long as the polarization directions can be made the same, λ/4 retardation films may be used, or desired retardation films may be provided on portions of the surface from which p-polarized light beams exit and portions of the surface from which s-polarized light beams exit.

In the polarization conversion element array 361, one block including one polarization separation film 366 and one reflective film 367 adjacent thereto and one λ/2 retardation film 364 can be considered as one polarization conversion element 368. The polarization conversion element array 361 has a plurality of such polarization conversion elements 368 disposed in the x direction.

The structure of the polarization conversion element array 362 is exactly the same as that of the polarization conversion element array 361, and thus it will not be described in further detail.

As shown in FIG. 2, the light-shielding plate 350 is disposed on a light-incident-surface side of the polarization conversion element array 360, and functions to adjust the amount of light incident upon the polarization separation films 366 from the first lens array 320. Therefore, light-shielding portions 351 and open portions 352 are disposed in a stripe-like arrangement. In other words, the light-shielding plate 350 is a plate-shaped member that is formed by alternately forming the opening portions 352 which allows light to pass through, and the light-shielding portions 351 which have about the same widths as the light-incident surfaces of the light-transmissive members 356, in correspondence with a light-incident surface of each light-transmissive member 365 of the polarization conversion element array 360 (361, 362). The light-shielding portions 351 and the opening portions 352 are disposed so that the sublight beams that have exited from the first lens array 320 are incident only upon the polarization separation films 366 of the polarization conversion element 360, and are not incident upon the reflective films 367.

As described above, the plurality of sub light beams that have exited from the first lens array 320 are each separated into two sub light beams by the polarization conversion element array 360, and the separated sub light beams are converted into substantially one type of linearly polarized light beams (s-polarized light beams and s-polarized light beams or p-polarized light beams and p-polarized light beams), each having the same wavelengths, by the corresponding λ/2 retardation films 364. The plurality of sub light beams that are formed by one type of linearly polarized light beams are superimposed on the illumination areas 410 of the corresponding liquid crystal light valves by the superimposing lens 370 shown in FIG. 2. At this time, the distribution of the intensity of light that illuminates the illumination areas 410 is substantially uniform.

The illumination optical system constructed in the above-described way causes illumination light that possesses the same polarization directions (such as s-polarized light beams and s-polarized light beams) to exit therefrom, and illuminates each of the liquid crystal panels 411R, 411G, and 411B through the color light separation optical system 380 and the relay optical system 390.

The color light separation optical system 380 in the optical unit 30 includes the two dichroic mirrors 382 and 386 and the reflective mirror 384, and functions to separate the light beams that exit from the illumination optical system into light beams of three colors, i.e., red (R) light beams, green (G) light beams, and blue (B) light beams. The first dichroic mirror 382 allows the red light component of the light that has exited from the illumination optical system to pass through, and reflects the blue light component and the green light component. The red light beams R that have passed through the first dichroic mirror 382 are reflected by the reflective mirror 384, and exit in the direction of the cross dichroic prism 420. The red light beams R that have been reflected by the reflective mirror 384 further pass through the field lens 400 and reach the liquid crystal light valve 410R for red light. The field lens 400 converts each of the sub light beams that have exited from the first lens array 320 of the illumination optical system so that each of them is parallel to a center axis thereof. This similarly applies to the field lenses 402 and 404 that are provided at the light-incident-surface sides of the liquid crystal light valves 410G and 410B, respectively.

Of the green light beams G and the blue light beams B that have been reflected by the first dichroic mirror 382, the green light beams G are reflected by the second dichroic mirror 386 and exit in the direction of the cross dichroic prism 420. The green light beams G that have been reflected by the second dichroic mirror 386 further pass through the field lens 402, and reach the liquid crystal light valve 410G for green light. On the other hand, the blue light beams B that have passed through the second dichroic mirror 386 exit from the color light separation optical system 380, and are incident upon the relay optical system 390.

The blue light beams B incident upon the relay optical system 390 reach the liquid crystal light valve 410B for blue light through the light-incident-side lens 392, the reflective mirror 394, the relay lens 396, the reflective mirror 398, and the field lens 404 of the relay optical system 390. The relay optical system 390 is used for the blue light beams B because the path of the blue light beams B is longer than the paths of the other color light beams R and G and is provided to reduce, minimize or prevent reduction in the efficiency of light used caused by, for example, light diffusion. In other words, the relay optical system 390 is provided to transmit substantially without change the sub light beams incident upon the light-incident-side lens 392 to the field lens 404.

The color light beams that have impinged upon the three liquid crystal light valves 410R, 410G, and 410B, respectively, are modulated in accordance with provided image information (image signals) in order to generate images of the corresponding colors. Here, the liquid crystal light valves 410R, 410G, and 410B include, respectively, the liquid crystal panels 411R, 411G, and 411B, light-incident-side polarizers 412R, 412G, and 412B, and at least two light-exiting-side polarizers 413R and 414R, 413G and 414G, and 413B and 414B.

FIG. 6 illustrates the structures of the liquid crystal light valves of the present invention. FIG. 6 also illustrates, in relation with polarization directions, the schematically shown optical systems within a region from the polarization generation optical system (polarization conversion element array 360) to the cross dichroic prism 420.

First, the red-light liquid crystal light valve 410R will be described. The liquid crystal light valve 410R includes the liquid crystal panel 411R, the light-incident-side polarizer 412R, the two light-exiting-side polarizers 413R and 414R, and a λ/2 retardation film 415R. The light-incident-side polarizer 412R and the light-exiting-side polarizers 413R and 414R are bonded to glass substrates 416R, 417R, and 418R, respectively. The polarization axis of the light-incident-side polarizer 412R and the polarization axis of the first light-exiting-side polarizer 413R that is closer to the liquid crystal panel 411R are disposed perpendicular to each other, while the polarization axis of the second light-exiting-side polarizer 414R is disposed in the same direction as the polarization axis of the first light-exiting-side polarizer 413R. Therefore, the light-incident-side polarizer 412R allows s-polarized light beams to pass through, while the first and second light-exiting-side polarizers 413R and 414R allow p-polarized light beams to pass through.

The s-polarized red light beams R that are incident upon the liquid crystal light valve 410R pass substantially without change through the glass substrate 416R and through the light-incident-side polarizer 412R, bonded to the glass substrate 416R, and are incident upon the liquid crystal panel 411R. The liquid crystal panel 411R converts some of the s-polarized light beams that have impinged thereupon into p-polarized light beams, and the first light-exiting-side polarizer 413R disposed at the light-exiting-surface side allows only the p-polarized light beams to pass through the glass substrate 417R. The polarization axis of the second light-exiting-side polarizer 414R is in the same direction as the polarization axis of the first light-exiting-side polarizer 413R, so that only the p-polarized light beams are allowed to pass through the glass substrate 418R. The p-polarized light beams that have passed through the first and second light-exiting-side polarizers 413R and 414R and the glass substrates 417R and 418R are incident upon the λ/2 retardation film 415R where they are converted into s-polarized light beams, which exit therefrom.

The green-light liquid crystal light valve 410G includes the liquid crystal panel 411G, the light-incident-side polarizer 412G, and the first and second light-exiting-side polarizers 413G and 414G. The light-incident-side polarizer 412G and light-exiting-side polarizers 413G and 414G are bonded to glass substrates 416G, 417G, and 418G, respectively. The polarization axis of the light-incident-side polarizer 412G and the polarization axis of the first light-exiting-side polarizer 413G that is closer to the liquid crystal panel 411G are disposed perpendicular to each other, while the polarization axis of the second light-exiting-side polarizer 414G is disposed in the same direction as the polarization axis of the first light-exiting-side polarizer 413G.

The s-polarized green light beams G that are incident upon the liquid crystal light valve 410G pass through the glass substrate 416G and the light-incident-side polarizer 412G virtually in the same state, and are incident upon the liquid crystal panel 411G. The liquid crystal panel 411G converts some of the s-polarized light beams that have impinged thereupon into p-polarized light beams, and the first light-exiting-side polarizer 413G disposed at the light-exiting-surface side allows only the p-polarized light beams to pass through the glass substrate 417G. The polarization axis of the second light-exiting-side polarizer 414G is in the same direction as the polarization axis of the first light-exiting-side polarizer 413G, so that only the p-polarized light beams are allowed to pass through the glass substrate 418G.

The blue-light liquid crystal light valve 410B has a similar structure to the red-light liquid crystal light valve 410R. The blue-light liquid crystal light valve 410B includes the liquid crystal panel 411B, the light-incident-side polarizer 412B, the first and second light-exiting-side polarizers 413B and 414B, and a λ/2 retardation film 415B. The light-incident-side polarizer 412B and light-exiting-side polarizers 413B and 414B are bonded to glass substrates 416B, 417B, and 418B, respectively.

The polarization axis of the light-incident-side polarizer 412B and the polarization axis of the first light-exiting-side polarizer 413B that is closer to the liquid crystal panel 411B are disposed perpendicular to each other, while the polarization axis of the second light-exiting-side polarizer 414B is disposed in the same direction as the polarization axis of the first light-exiting-side polarizer 413B.

The s-polarized blue light beams B that are incident upon the liquid crystal light valve 410B pass substantially without change through the glass substrate 416B and the light-incident-side polarizer 412B, bonded to the glass substrate 416B, and are incident upon the liquid crystal panel 411B. The liquid crystal panel 411B converts some of the s-polarized light beams that have impinged thereupon into p-polarized light beams, and the first light-exiting-side polarizer 413B disposed at the light-exiting-surface side allows only the p-polarized light beams to pass through the glass substrate 417B. The polarization axis of the second light-exiting-side polarizer 414B is in the same direction as the polarization axis of the first light-exiting-side polarizer 413B, so that only the p-polarized light beams are allowed pass through the glass substrate 418B. The p-polarized light beams that have passed through the first and second light-exiting-side polarizers 413B and 414B and the glass substrates 417B and 418B are incident upon the $\lambda/2$ retardation film 415B where they are converted into s-polarized light beams, which exit therefrom.

The cross dichroic prism 420 synthesizes the modulated color light beams of three colors, which have been passing through and modulated in the liquid crystal light valves 410R, 410G, and 410B, in order to generate synthesized light that represents a color image. In the cross dichroic prism 420, a red light reflective film 421 and a blue light reflective film 22 are formed in a substantially X shape arrangement at interfaces of four right-angle prisms. The red light reflective film 421 is formed by a dielectric multilayer film that selects and reflects red light, whereas the blue light reflective film 422 is formed by a dielectric multilayer film that selects and reflects blue light. The color light beams of three colors are synthesized by the red light reflective film 421 and the blue light reflective film 422 in order to generate synthesized light that represents a color image.

The two reflective films 421 and 422, which form the cross dichroic prism 420, reflects s-polarized light beams better than p-polarized light beams, and they transmits p-polarized light beams better than s-polarized light beams. Therefore, the light beams to be reflected by the two reflective films 421 and 422 are s-polarized light beams, whereas the light beams to be transmitted through the two reflective films 421 and 422 are p-polarized light beams. This operation is to increase the efficiency of light use at the cross dichroic prism 420. Thus, one $\lambda/2$ retardation film is inserted for at least the red light and the blue light. The $\lambda/2$ retardation films may be inserted either in front of or behind (the light-incident side or the light-exiting side) of their corresponding liquid crystal light valves. The $\lambda/2$ retardation films may also be used by bonding them to polarizers.

The synthesized light that has been generated by the cross dichroic prism exits in the direction of the projection lens 430. The projection lens 430 projects the synthesized light that has exited from the cross dichroic prism 420 in enlarged form onto a screen (not shown) where a color image is displayed.

In the present invention, the liquid crystal light valves 410R, 410G, and 410B each include at least two corresponding polarizers 413R and 414R, 413G and 414G, and 413B and 414B, which are disposed respectively at light-exiting-surface sides of the liquid crystal panels 411R, 411G, and 411B. Therefore, even when a black display is provided on the entire screen, the task of absorbing light can be divided among each of the light-exiting-side polarizers 413 and the light-exiting-side polarizers 414. (These reference numerals denote the light-exiting-side polarizers of any one of the liquid crystal light valves. Similarly, the other component parts are also represented by representative reference numerals.) For example, the ratio of the division of the task may be 1:1 for the first light-exiting-side plates 413 and the corresponding second light-exiting-side polarizers 414; or first light-exiting-side polarizers 413 having low polarization degrees and second light-exiting-side polarizers 414 having high polarization degrees may be used, so that they have different absorptivities (for example, the first light-exiting-side polarizers 413 have absorptivities of 60%, and the second light-exiting-side polarizers 414 have absorptivities of 99.9%). More specifically, polarizers having high weather resistances, such as dye polarizers which are resistant to light and heat, may be used as the first light-exiting-side polarizers 413, while polarizers having high polarization degrees, such as iodine polarizers having high contrast ratios, may be used as the second light-exiting-side polarizers 414.

In this manner, by providing two or more light-exiting-side polarizers 413 and 414 at the light-exiting-surface side of each of the liquid crystal panels 411, the task of absorbing light is divided among these light-exiting-side polarizers 413 and light-exiting-side polarizers 414 to distribute the heat produced by light absorption, thereby making it possible to reduce the burden thereon. Therefore, the life of the light-exiting-side polarizers 413 and the light-exiting-side polarizers 414 becomes longer, thereby making it possible for the projection display device to provide sufficiently high brightness.

In the embodiment shown in FIG. 6, similarly to the light-incident-side polarizers 412, the first light-exiting-side polarizers 413 and the second light-exiting-side polarizers 414 are constructed so that glass substrates 417 and the glass substrates 418 are bonded thereto, respectively. Transparent materials having high thermal conductivities, such as sapphire or crystals, may be used as the supporting substrates 417 and the supporting substrates 418 of these light-exiting-side polarizers 413 and the light-exiting-side polarizers 414. Since sapphire and crystals have higher thermal conductivities than glass, temperature rises in the light-exiting-side polarizers 413 and the light-exiting-side polarizers 414 can be reduced.

As shown in FIG. 7, first light-exiting-side polarizers 413 and second light-exiting-side polarizers 414 may be bonded to the front and back sides of the same supporting substrates 419, respectively. Similarly to the above structure, the supporting substrates 419 are formed of transparent materials having high thermal conductivities, such as sapphire or crystals. As shown in FIG. 8, second light-exiting-side polarizers 414 may be bonded to a cross dichroic prism 420. In this case, for the cross dichroic prism 420, it is necessary to use glass member having a thermal conductivity that is as high as possible, and to provide $\lambda/2$ retardation films 415R and 415B at a red-light liquid crystal light valve 41 OR and a blue-light liquid crystal light valve 410B at the light-incident sides thereof, respectively.

In this case, it is preferable to use a glass member having high thermal conductivity for the cross dichroic prism 420. This material is used to reduce a temperature rise in the second light-exiting-side polarizer 414R. The aforementioned glass member relates to a transparent member formed of, for example, glass, sapphire or crystal.

As shown in FIGS. 1, 6, and 8, the first light-exiting-side plates 413 and the second light-exiting-side plates 414 are spacially separated from each other by gaps, with cooling gas (such as air) 440 being made to flow in the gaps. This is one method for restricting temperature rises in the first light-exiting-side polarizers 413 and the second light-exiting-side polarizers 414. Instead of gas, a liquid may be made to flow in the gaps or they may be soaked in the liquid. In these cases, the cooling effect is even greater than that of gas. In FIG. 1, for simplicity, arrows that represent the direction of flow of the cooling gas are not shown.

Although the embodiments of the present invention described above are applied to a projection display device using transmissive liquid crystal light valves, the present invention may also be applied to a projection display device using reflective liquid crystal light valves. Here, a transmissive liquid crystal light valve relates to a type of liquid crystal light valve that allows light to pass through, while a reflective liquid crystal light valve refers to a type of liquid crystal light valve that reflects light.

In a projection display device using reflective liquid crystal light valves, a dichroic prism may be used as a color light separating device that separates light into color light beams of three colors, a red light beam, a green light beam, and a blue light beam, and as a color light synthesizing device that synthesizes the color light beams of three colors that have been modulated in order to cause the synthesized light to exit therefrom in the same direction.

Types of projection display devices include front projection display devices that project an image from the direction in which a projected image is observed and rear projection display devices that project an image from a side that is opposite to the direction of observation of a projected image. The structures of the embodiments of the invention can be applied to both of these types of projection display devices, for example.

As described above, according to the present invention, since at least two polarizers are provided at the light-exiting-surface sides of the liquid crystal panels, the burden on the polarizers can be reduced by dividing the task of absorbing light among the plurality of polarizers. Therefore, the life of the liquid crystal light valves is increased, thereby making it possible for the projection display device to provide sufficiently high brightness.

What is claimed is:

1. A liquid crystal light valve that modulates incident light in accordance with image information, wherein comprising:
 a liquid crystal panel; and
 at least two polarizers provided at a light-exiting-surface side of a the liquid crystal panel.

2. A The liquid crystal light valve according to claim 1, a polarization degree of a first polarizer of the at least two polarizers that is closer to the light-exiting-surface side of the liquid crystal panel is being lower than the a polarization degree of a second polarizer of the at least two polarizers.

3. The liquid crystal light valve according to claim 2, further including at least one of cooling gas and cooling liquid, the first and second polarizers being spatially separated by a gap, such that the at least one of the cooling gas and the cooling liquid being allowed to pass through the gap.

4. A projector, comprising:
 the liquid crystal light valve according to claim 1; and
 a color light separation optical system that separates corresponding color light beams of three colors.

5. The projector according to claim 4, the liquid crystal light valve including at least a red-light liquid crystal light valve and a blue-light liquid crystal light valve that include $\lambda/2$ retardation films.

* * * * *